US008312706B2

(12) United States Patent
Laforest et al.

(10) Patent No.: US 8,312,706 B2
(45) Date of Patent: Nov. 20, 2012

(54) PULSE COMBUSTOR INCLUDING ACOUSTIC ELEMENTS

(75) Inventors: Luc Laforest, Roberval (CA); Dennis Vivian Collins, Roberval (CA)

(73) Assignee: Atlantis Research Labs, Regina, Saskatchewan (CA)

( * ) Notice: Subject to any disclaimer, the term of this patent is extended or adjusted under 35 U.S.C. 154(b) by 0 days.

(21) Appl. No.: 13/303,316

(22) Filed: Nov. 23, 2011

(65) Prior Publication Data

US 2012/0100495 A1     Apr. 26, 2012

Related U.S. Application Data

(62) Division of application No. 11/994,690, filed as application No. PCT/CA2006/000950 on Jun. 8, 2006, now Pat. No. 8,083,494.

(60) Provisional application No. 60/695,888, filed on Jul. 5, 2005, provisional application No. 60/706,006, filed on Aug. 8, 2005.

(51) Int. Cl.
  *F02K 5/02*     (2006.01)
  *F02K 7/00*     (2006.01)
(52) U.S. Cl. .......... 60/247; 60/249; 60/39.77; 60/39.38; 431/114

(58) Field of Classification Search ............... 60/247, 60/248, 249, 39.38, 39.76, 39.77, 725; 431/1, 431/114
See application file for complete search history.

(56) References Cited

U.S. PATENT DOCUMENTS

| 2,731,795 | A | * | 1/1956 | Bodine | 60/39.77 |
| 2,812,635 | A | * | 11/1957 | Le Foll et al. | 60/249 |
| 3,035,413 | A | * | 5/1962 | Linderoth | 60/39.77 |
| 3,093,962 | A | * | 6/1963 | Gluhareff | 60/249 |
| 3,266,252 | A | * | 8/1966 | Hughes | 60/39.77 |
| 3,514,956 | A | * | 6/1970 | Bray | 60/269 |
| 3,533,239 | A | * | 10/1970 | Ghougasian | 60/244 |
| 4,770,626 | A | * | 9/1988 | Zinn et al. | 431/1 |
| 6,216,446 | B1 | * | 4/2001 | Stram | 60/249 |
| 7,637,096 | B2 | * | 12/2009 | Razzell et al. | 60/247 |

* cited by examiner

*Primary Examiner* — William H Rodriguez
(74) *Attorney, Agent, or Firm* — King & Schickli, PLLC

(57) ABSTRACT

The present specification generally relates to improvements to combustors such as burners and engines. In one aspect, the specification presents an acoustically enhanced ejector system which can be used as part of an intake system for a combustor. In another aspect, the specification teaches the use of a combustor combustion chamber as an oscillator to magnify a harmonic frequency of a pulsating frequency of the combustor. In still other aspects, the specification presents a combustion chamber having an inlet with a plurality of tangentially spaced apertures, and an in-line intake system connected to the apertures.

13 Claims, 15 Drawing Sheets

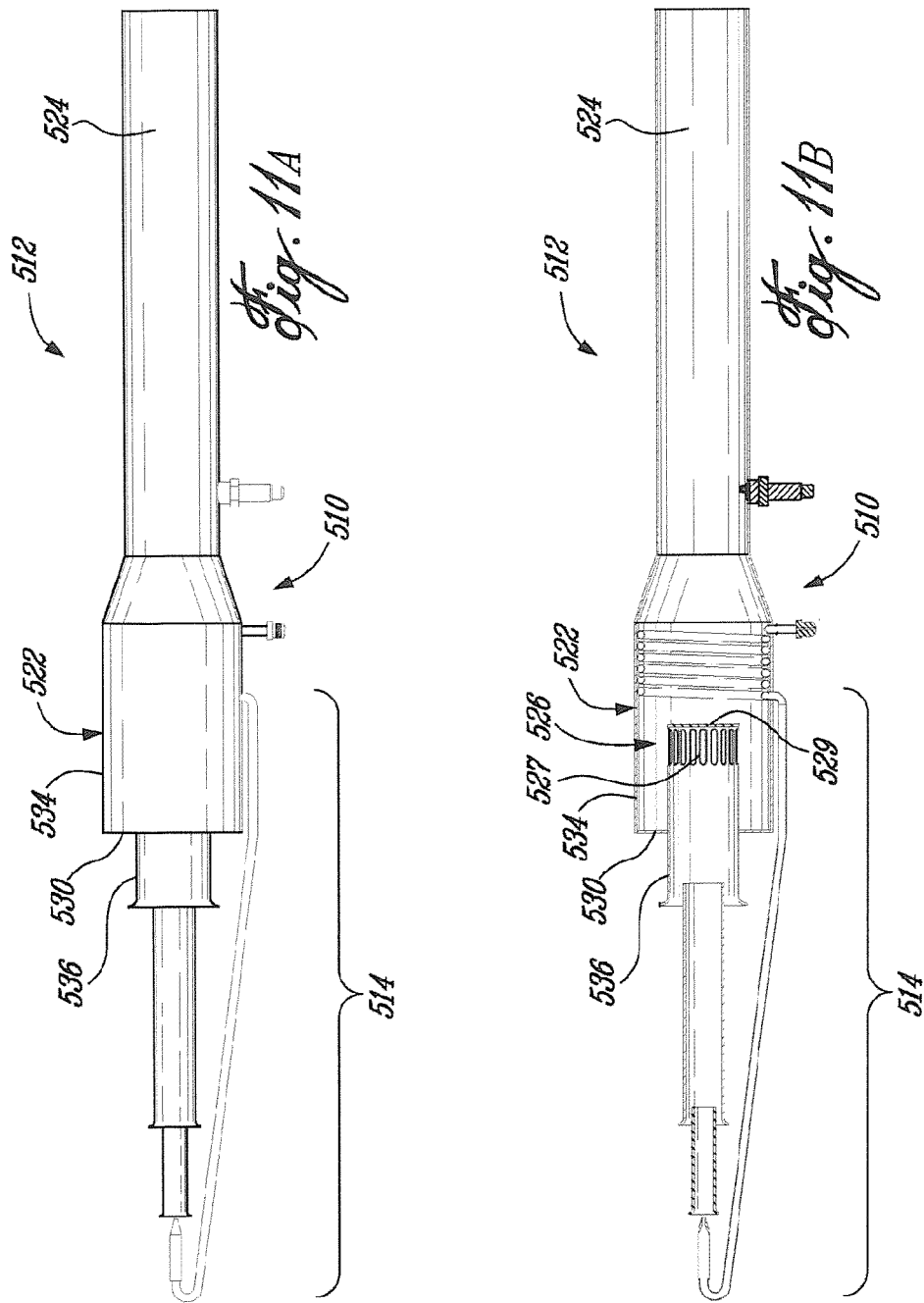

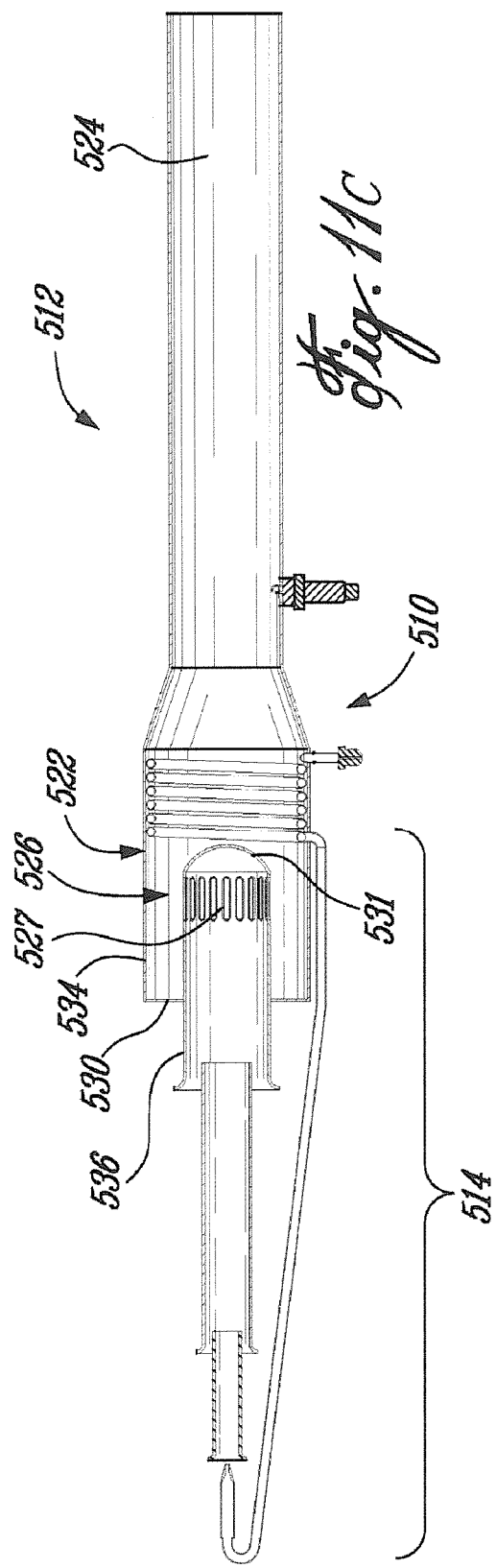

PULSE COMBUSTOR INCLUDING ACOUSTIC ELEMENTS

CROSS-REFERENCE TO RELATED APPLICATIONS

The present application is a Divisional of U.S. patent application Ser. No. 11/994,690, filed Jan. 4, 2008 now U.S. Pat. No. 8,083,494, which is the National Stage of International Application No. PCT/CA2006/000950 filed Jun. 8, 2006, which claims priority to U.S. provisional patent application No. 60/695,888, filed Jul. 5, 2005; U.S. provisional patent application No. 60/706,006 filed Aug. 8, 2005; and Canadian patent application no. 2,512,937, filed Jul. 28, 2005; all of which are hereby incorporated by reference.

FIELD

The improvements relates to the field of combustors, and more particularly to combustors for use as burners or as engines.

BACKGROUND

Pulse combustors have been known for many years. They work on the principle that a load of mixed fuel and air periodically enters a combustion chamber where it ignites, therefore giving a pulse combustion. Some pulse combustors are specifically adapted for use as burners. Other pulse combustors are specifically adapted for use as engines of the pulse-jet type. Typical pulse-jet engines use valves which periodically allow fuel and air intake. There is a general need in the field of pulse combustors to enhance efficiency, durability and thrust output of pulse combustors.

U.S. Pat. No. 3,093,962 to Gluhareff teaches a valveless pulse-jet engine and somewhat discusses the use of acoustics. There is a need in the art to somewhat elaborate on the teachings of Gluhareff.

Furthermore, known pulse combustors are typically limited to a pulse mode of combustion.

An aim of the improvements is to alleviate some of the needs concerning combustors.

In accordance with one aspect, the improvements provide an ejector system comprising: a supersonic fluid injection nozzle having an acoustic injection frequency and amplitude; a first resonant tube having an inlet coupled to the nozzle for receiving the injected fluid from the nozzle and ambient fluid entrained by the injected fluid, and an outlet for ejecting the fluids, the first resonant tube having a first fundamental resonance frequency excitable by the nozzle injection; and a second resonant tube having an inlet coupled to receive the fluids ejected from the outlet of the first resonant tube outlet for receiving the ejected fluids and additional ambient fluid entrained by the ejected fluids, and an outlet for ejecting the fluids received by the inlet, the second resonant tube having a second fundamental resonance frequency being a sub-harmonic of the first fundamental resonance frequency.

In accordance with an other aspect, the improvements provide an ejector system having a first resonant tube having a first fundamental resonance frequency, an inlet and an outlet, a second resonant tube wider than the first resonant tube having a second fundamental resonance frequency, an inlet coupled to the outlet of the first resonant tube, and an outlet, and a supersonic fluid nozzle aerodynamically coupled to the inlet of the first resonant tube, the supersonic fluid nozzle having an acoustic injection frequency and amplitude suitable to acoustically excite the first and the second resonant tubes, the ejector system being CHARACTERIZED IN THAT the first resonance frequency is a harmonic of the second resonance frequency.

In accordance with an other aspect, the improvements provide an intake system for a combustor having a pulsating frequency, the intake system comprising: a supersonic injection fuel nozzle having an acoustic injection frequency and amplitude; a first resonant tube having an inlet coupled to the nozzle for receiving the injected fuel and ambient air entrained by the injected fuel, and an outlet for ejecting the fuel and the air, the first resonant tube having a first fundamental resonance frequency excitable by the fuel nozzle; a second resonant tube having an inlet coupled to the outlet of the first resonant tube for receiving the ejected fuel and air and additional ambient air entrained by the ejected fuel and air, and an outlet, the second resonant tube having a second fundamental resonance frequency being a sub-harmonic of the first fundamental resonance frequency; and a resonant intake tube having an inlet coupled to the outlet of the second resonant tube for receiving the fluids ejected from the second resonant tube outlet and additional ambient fluid entrained by these ejected fluids, and an outlet connected to a combustion chamber inlet of the combustor.

In some cases, the combustor further has a resonator having a fundamental resonance frequency which corresponds to the pulsating frequency, the resonator further having the combustion chamber inlet, an outlet, an oscillator for use as the combustion chamber, having the inlet at an acoustic center thereof and defining one end of the resonator, and an exhaust pipe extending from the oscillator and having the outlet at the opposite end of the resonator, wherein the oscillator has a resonance frequency which is an odd harmonic of the pulsating frequency and at least one of the coupling between the first resonant tube and the second resonant tube and the coupling between the second resonant tube and the intake tube has a difference of area and a penetration depth suitable for the intake system to define a high-pass filter having a cut-off frequency between the pulsating frequency and the oscillator fundamental frequency.

In some cases, the odd harmonic is the third harmonic.

In accordance with an other aspect, the improvements provide a method of ejecting fluid, the method comprising: making high frequency noise by injecting one of an over-expanded and under-expanded supersonic flow of fluid into a first resonant tube at a speed sufficient for the fluid momentum to entrain ambient fluid through the first tube, and for the fluid exiting the first tube to entrain further air particles through a second tube; and driving the first tube into resonance using the high frequency noise, and driving the second tube into resonance using the resonance of the first tube.

In some cases, the ejected fluid is fuel and the ambient fluid is air.

In accordance with an other aspect, the improvements provide an acoustic cavity for use in a combustor having a pulsating frequency, the acoustic cavity comprising: a resonator with a fundamental resonance frequency which corresponds to the pulsating frequency of the combustor, the resonator further having an inlet, and an outlet; an oscillator made integral to the resonator and defining one end thereof, being for use as a combustion chamber, having a fundamental resonance frequency which is an odd harmonic of the pulsating frequency and having the inlet at an acoustic center thereof, and an exhaust pipe made integral to the resonator and having the outlet at an opposite end thereof, the exhaust pipe extending from the oscillator.

In accordance with an other aspect, the improvements provide a combustor comprising: a resonator having a fundamental resonance frequency which corresponds to a pulsating frequency of the combustor when operating in a pulse mode, the resonator further having: an oscillator for use as a combustion chamber, having a fundamental resonance frequency which is an odd harmonic of the pulsating frequency, and having an inlet at an acoustic center thereof, the oscillator defining one end of the resonator, and an exhaust pipe extending from the oscillator and having an outlet at the opposite end of the resonator; and an intake system connected to the inlet to feed the combustion chamber with fuel and air.

In accordance with an other aspect, the improvements provide an acoustic cavity for use in a combustor having a pulsating frequency, the acoustic cavity having a resonator with a fundamental resonance frequency which corresponds to the pulsating frequency of the combustor, the resonator further having an inlet, an outlet, an oscillator for use as a combustion chamber, having the inlet at an acoustic center thereof and defining one end of the resonator, and an exhaust pipe extending from the oscillator and having the outlet at the opposite end of the resonator, the acoustic cavity being CHARACTERIZED IN THAT the oscillator has a fundamental resonance frequency which is an odd harmonic of the pulsating frequency.

In accordance with an other aspect, the improvements provide a combustor having a resonator with a fundamental resonance frequency, the resonator further having an inlet and an outlet, and a combustion chamber opposite the outlet, the combustion chamber defining an oscillator and having the inlet at an acoustic center thereof, the combustor further having an intake system connected to the inlet, the combustor being CHARACTERIZED IN THAT the oscillator has a fundamental resonance frequency which is a harmonic of the resonator fundamental frequency, the intake system is acoustically excitable by the oscillator fundamental frequency, and the intake system defines an acoustic high-pass filter to reflect the resonator fundamental frequency back into the combustion chamber.

In accordance with an other aspect, the improvements provide a method of pulsatingly combusting fuel in a resonator at a fundamental resonance frequency of the resonator, the method comprising: magnifying a harmonic frequency of the fundamental resonance frequency in a combustion chamber portion of the resonator; exciting an acoustic high-pass filter defined by an intake system connected to the combustion chamber with the magnified harmonic frequency; impeding the transmission of the pressure pulses from the fundamental resonance frequency to the intake system with the excited acoustic high-pass filter; and feeding fuel and air into the combustion chamber with the intake system; and periodically increasing the pressure in the combustion chamber by the resonance of the resonator.

In accordance with an other aspect, the improvements provide a combustor having a main longitudinal axis and a pulsating frequency, the combustor comprising: a tubular combustor body having an outlet, a combustion chamber opposite the outlet and an exhaust pipe narrower than the combustion chamber between the combustion chamber and the outlet, the combustion chamber, exhaust pipe and outlet being in flow communication along the main longitudinal axis, and the body having a resonance frequency corresponding to the pulsating frequency; a plurality of substantially longitudinally oriented slots interspaced around the combustion chamber at a longitudinal acoustic center thereof, the slots defining an inlet to the body; and an intake system connected to the combustion chamber inlet.

In accordance with an other aspect, the improvements provide a combustor having an elongated combustion chamber having an inlet proximate a longitudinal center thereof, an intake system connected to the combustion chamber inlet, and a tail pipe extending from the combustion chamber and defining an outlet thereto, wherein the combination of the combustion chamber and the tail pipe define an acoustic resonator having a fundamental resonance frequency at which fuel from the intake system is to be pulsatingly ignited in the combustion chamber, the combustor being CHARACTERIZED IN THAT the inlet comprises a plurality of longitudinally oriented slots being peripherally interspaced around the combustion chamber.

In accordance with an other aspect, the improvements provide a combustor comprising: a tubular combustor body, the body having: a combustion chamber having a plurality of tangentially spaced apertures, and an exhaust pipe narrower than the combustion chamber and extending away from the combustion chamber and being in flow communication therewith, the exhaust pipe defining an outlet of the tubular combustor body; and an intake system connected to the apertures to feed the combustion chamber with fuel and air.

In some cases, the apertures are disposed in a peripheral surface of the combustion chamber. In other cases, the apertures are disposed around an intake tube which protrudes into the combustion chamber.

In accordance with an other aspect, the improvements provide a combustor having a main longitudinal axis comprising: a tubular combustor body having an outlet, a combustion chamber portion opposite the outlet and an exhaust pipe narrower than the combustion chamber between the combustion chamber and the outlet, the combustion chamber portion, exhaust pipe and outlet being disposed along the main longitudinal axis, and the body having a resonance frequency corresponding to a pulsating frequency of the combustor; an intake system having an intake tube longitudinally penetrated into the combustion chamber along the main axis, opposite the outlet, the intake tube having an open end outside the combustion chamber, a closed end inside the combustion chamber, and plurality of longitudinally oriented apertures tangentially interspaced around the intake tube at a longitudinal acoustic center of the combustion chamber, the slots defining an inlet to the combustion chamber.

In accordance with an other aspect, the improvements provide a combustor having an elongated combustion chamber having an inlet proximate a longitudinal center thereof, an intake system connected to the combustion chamber inlet, and an exhaust pipe extending from the combustion chamber and defining an outlet thereto, wherein the combination of the combustion chamber and the tail pipe define an acoustic resonator having a fundamental resonance frequency at which fuel from the intake system is to be pulsatingly ignited in the combustion chamber, the combustor being characterized in that the intake system is aligned on an axis common to the combustion chamber and to the exhaust pipe and that the combustion chamber inlet is peripheral to the combustion chamber.

In accordance with an other aspect, the improvements provide a turbine system for an in-line combustor having an intake system, a body and an outlet aligned along a combustor axis, the turbine system having a power turbine adapted to extract energy from the gasses exhausted from the outlet into rotation, a fan positioned upstream from the intake system, and a shaft connecting the power turbine to the shaft, whereby energy from the exhausted gasses is transmitted from the power turbine to the fan by the rotation of the shaft and the fan thereby enhances the air intake through the intake system.

In accordance with an other aspect, the improvements provide a method of tuning a combustor having a body defining a resonator and a combustion chamber in the body, the method comprising: selecting a combustion chamber shaped to define an oscillator which has a fundamental resonance frequency which is the third harmonic of the resonator fundamental frequency at operation temperature.

In accordance with an other aspect, the improvements provide a method of tuning an ejector having a high frequency fluid nozzle, a first resonant tube and a second resonant tube, the method comprising: selecting a first stage resonant tube which has a fundamental resonance frequency which is a harmonic of the fundamental resonance frequency of the second resonant tube.

In the present specification, when reference is made to a resonant frequency, it is to be understood that what is meant is the resonant frequency during operation, which may depart from resonant frequency at rest due to temperature variations.

DESCRIPTION OF THE FIGURES

Further features and advantages of the present provements will become apparent from the following detailed description, taken in combination with the appended figures, in which:

FIGS. 11A, is a side view showing an other configuration of an in-line combustor in accordance with the improvements;

FIGS. 11B and 11C are cross-section views showing alternate configurations of an in-line combustor in accordance with the improvements;

DETAILED DESCRIPTION

Figure 1:
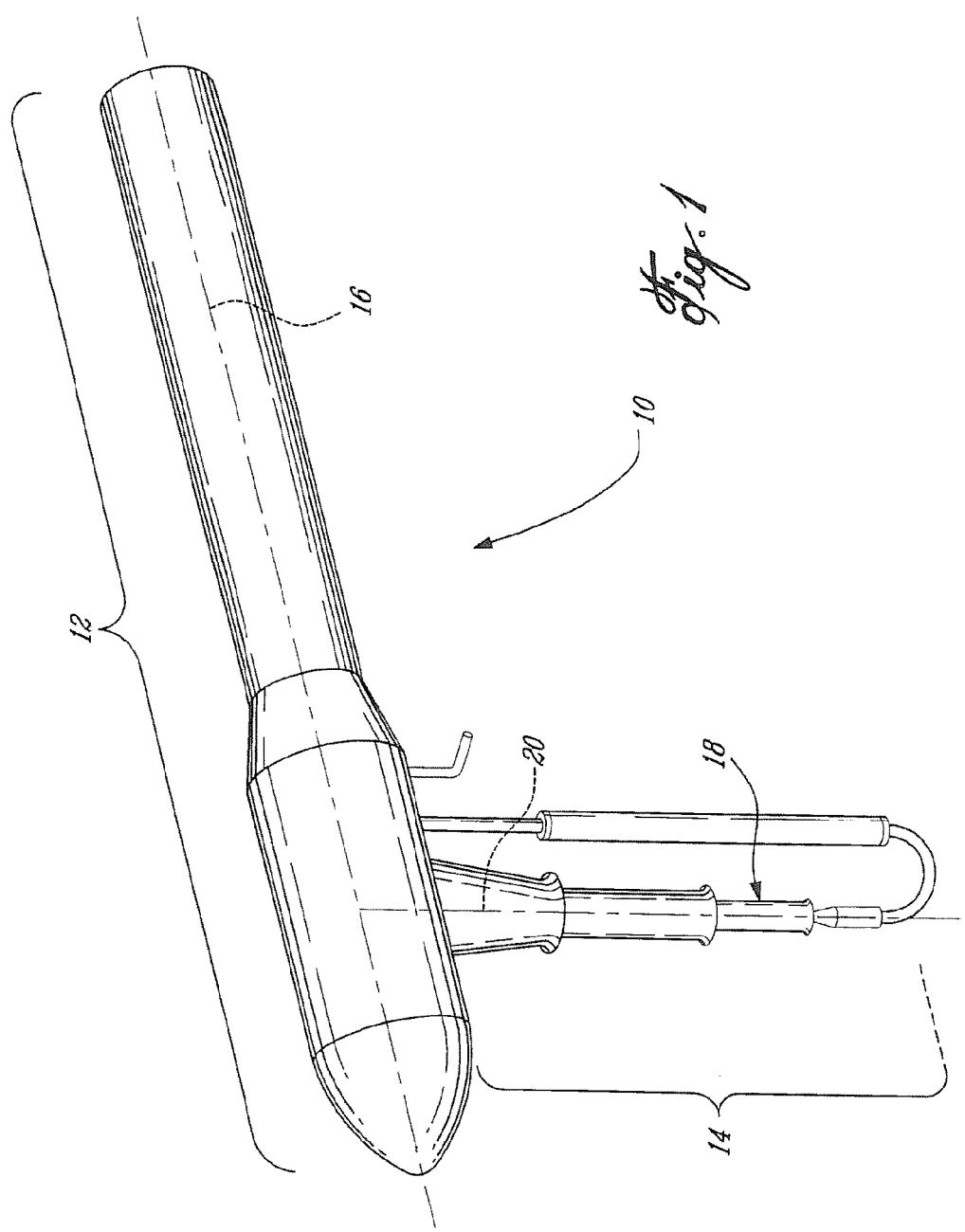
FIG. 1 is a perspective view of an L shape pulse combustor in accordance with the improvements.

Referring to the drawings, and more particularly to FIG. 1, an example of a pulse combustor 10 having a configuration referred to herein as "L-shaped configuration" is shown. The pulse combustor 10 can be used as a burner to generate a hot air flow and can alternately be used as a pulse-jet engine to generate thrust. Typically, when the combustor 10 is used as a burner, it will be mounted to a fixed frame. When it is used as an engine, it will be mounted to a displaceable vehicle. The pulse combustor 10 generally includes a body 12 and an intake system 14. The body 12 has a generally tubular shape. In the example, the body 12 has an irregular surface of revolution tubular shape aligned along a main axis 16. The intake system 14 will be recognized by those skilled in the art to include an ejector system 18 and is aligned along an intake axis 20. The main axis 16 and the intake axis 20 are transverse, thus giving the L-shape configuration. In the illustrated example, the angle between the main axis 16 and intake axis 20 is of 90 degrees, with the axes being in a common plane. Other angles can be used as well.

Figure 2:
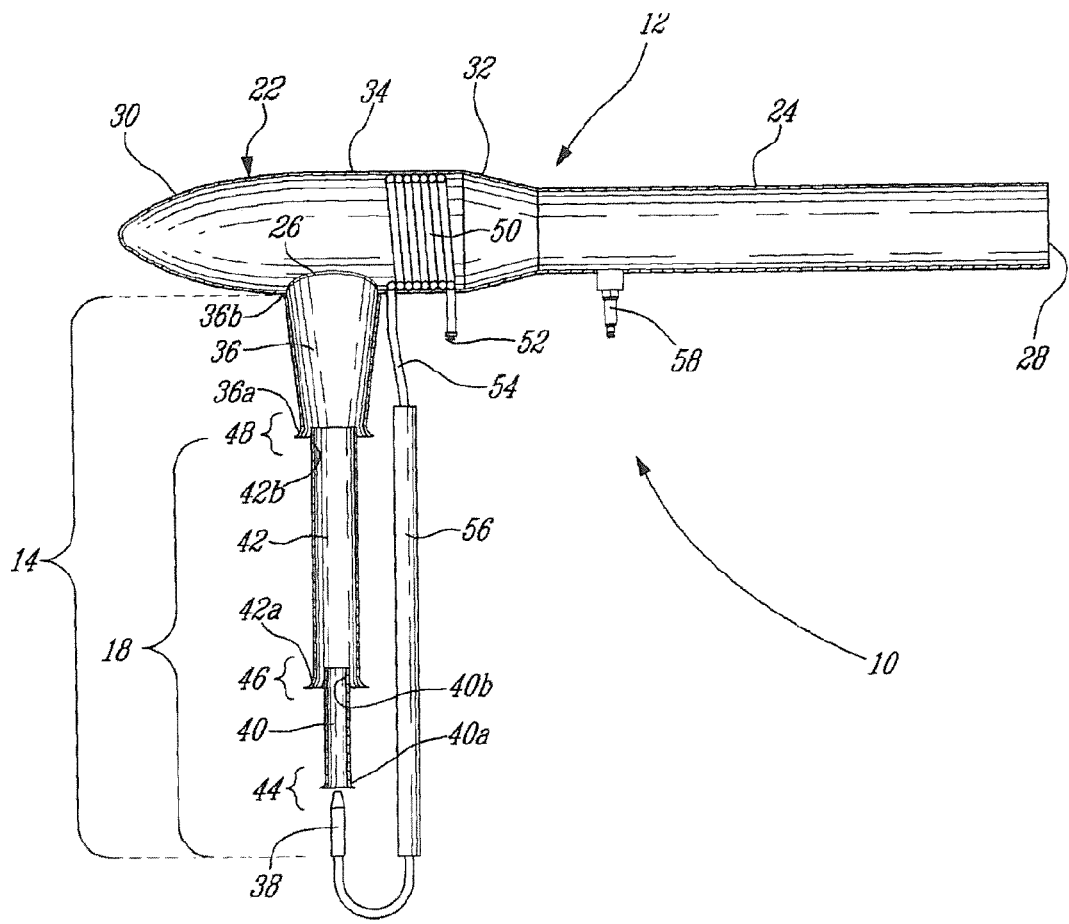
FIG. 2 is a cross-sectional view of the pulse combustor of FIG. 1 showing the structural elements thereof.

Referring now to FIG. 2, it is seen that the body 12 includes two portions: a combustion chamber 22 and an exhaust pipe 24. The body 12 has an inlet 26 located in the combustion chamber 22 and an outlet 28 at the end of the exhaust pipe 24. The combustion chamber 22 is wider than the exhaust pipe 24. The combustion chamber 22 includes a nose cone 30 opposite to the outlet 28 and having the pointed end outwardly oriented, a converging section 32 bridging the combustion chamber 22 to the exhaust pipe 24 and a generally cylindrical section 34 between the nose cone 30 and the converging section 32. The inlet 26 is located in the cylindrical section 34.

The intake system 14 includes an intake tube 36 having an inlet 36a and an outlet 36b, and the outlet 36b is connected to the combustion chamber inlet 26. In this example, the intake tube 36 is flared and defines a diverging section between the intake tube inlet 36a and the intake tube outlet 36b. This contributes to slowing the gasses entering the combustion chamber 22 from the intake system 14. The ejector system 18 is coupled to the intake tube inlet 36a. The ejector system 18 includes a supersonic fuel nozzle 38 coupled to the inlet 40a of a first tube 40, and a second tube 42 having an inlet 42a coupled to the outlet 40b of the first tube 40. The outlet 42b of the second tube 42 is coupled to the inlet 36a of the intake tube 36. The intake system 14 includes a first tube coupling 44. The first tube coupling 44 includes an adjustment of the relative position between the supersonic fuel nozzle 38 and the first tube 40, and an adjustment of the cross-sectional area of the first tube 40. The intake system 14 also includes a second tube coupling 46 and an intake tube coupling 48.

The tubes 40, 42, 36 of the intake system 14 can be maintained in position relative to each other in many possible ways. In one example where the combustor is used as a burner, each component of the intake system can be mounted to a common frame (not shown). In another example where the combustor is used as an engine, the tubes can be connected to one another with suitable brackets. The exact choice thereof is left to those skilled in the art.

Those familiar with the principles of ejectors will understand that the coupling 44 between the nozzle 38 and first tube 40 is such that the fuel exiting the supersonic fuel nozzle 38 at high velocity transfers some of its momentum to adjacent particles of air which entrains a flow of air through the first tube 40 with the flow of fuel. The coupling 46 between the first tube 40 and second tube 42 allows fuel and air exiting the first tube 40 to transfer some of its angular momentum and entrain more air through the second tube 42. The air mixes with the fuel as it travels through the first and second tubes. Similarly, the coupling 48 between the second tube 42 and the intake tube 36 allows fuel and air exiting the second tube 42 to transfer some of its angular momentum and entrain more air through the intake tube 36 and into the combustion chamber 22.

The mixture of air and fuel entering the combustion chamber 22 is pulsatingly ignited at a pulsating frequency of the pulse combustor 10, and the combustion products are exhausted out the exhaust pipe outlet 28. This combustion mode will be referred to herein as the pulse mode. The basic cycle of the pulse mode will be outlined further below with relation to combustor acoustics.

In this example, the fuel used is gas and can be propane. The supersonic fuel nozzle 38 is adapted to inject such a gaseous fuel. When a gaseous fuel is used, it can be advantageously pre-heated inside the combustion chamber 22. One way to achieve this is to use a coil 50 in the combustion chamber 22 through which the gaseous fuel circulates prior to reaching the fuel nozzle 38. A fuel source (not shown) is connected to a fuel inlet 52. The fuel inlet 52 is connected to the coil 50 through the combustion chamber wall. The coil 50 has a fuel outlet 54 which exits through the combustion chamber wall and is connected to the fuel nozzle 38. During operation of the pulse combustor 10, heat may thus be transferred from the combustion chamber 22 to the fuel through the coil 50.

It will be seen from the description below that the acoustics of the pulse combustor 10 is an important consideration in maximizing its output power. It was demonstrated by experiment that the coil 50 has a tendency to absorb acoustic vibrations by vibrating, which has been shown to lower the combustor's efficiency or power output. For this reason, it can be advantageous to secure the coil 50 to the combustion chamber in a manner to minimize its tendency to vibrate. However, one will understand that it is practically impossible to entirely eliminate coil vibration. Resulting coil vibration has a tendency to propagate through the material of the conduit connecting the coil outlet 54 to the fuel nozzle 38, especially if this material is rigid. Such vibrations have been known to negatively influence the injecting action of the fuel nozzle 38. For this reason, it has been found advantageous to use a flexible hose 56 at some point between the coil outlet 54 and the fuel nozzle 38. The flexible hose 56 dissipates energy from the coil vibration and minimizes the amount of vibration which affects the fuel nozzle 38.

It is to be understood that instead of a gaseous fuel, a liquid fuel can be used with a supersonic fuel nozzle which is adapted to inject a liquid fuel. In this case, there is typically no need to preheat the fuel in the combustion chamber and it is to be understood therefore that the coil and flexible hose can be entirely omitted. Such an embodiment is depicted for example in FIG. 3. When selecting a fuel, one must consider the flame propagation speed relatively to the pulsating frequency and the size of the combustion chamber of the pulse combustor.

At combustor startup, an igniter such as an igniter electrode 58 is used to start the pulse combustor 10 into operation. In the example, the igniter electrode 58 positioned in the wall of the exhaust pipe 24, near the converging section 32 of the combustion chamber 22, is used to start the combustor 10. However as it will be seen below, once the combustor 10 has warmed up, it can be autonomous and maintain its operating cycle by automatically lighting the fuel at the pulsating frequency. At that point, no igniter is necessary to maintain the combustor into operation. For this reason, it is believed that using an igniter which is permanently part of the combustor is not essential in certain embodiments.

Figure 3:
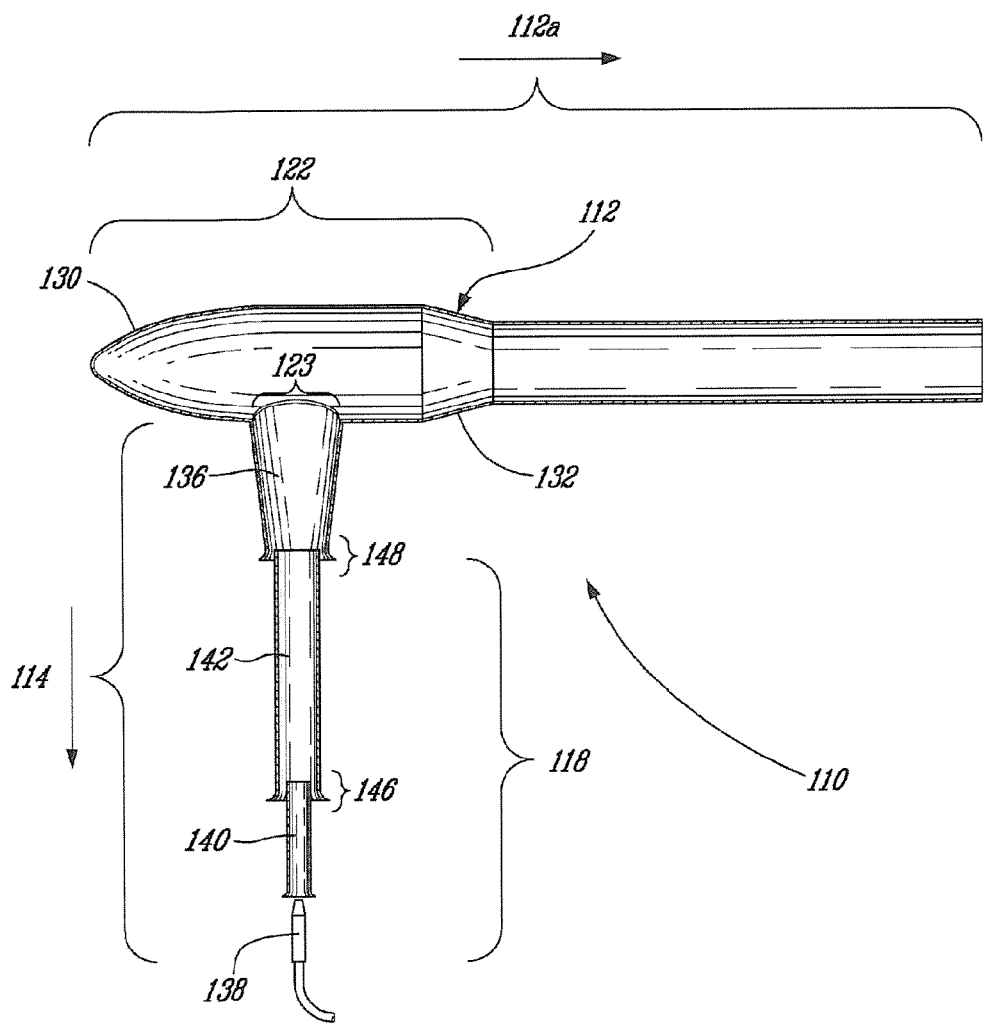
FIG. 3 is a cross-sectional view of the pulse combustor of FIG. 1 showing the acoustic elements thereof.

Referring to FIG. 3, a pulse combustor skeleton being quite similar to that illustrated in FIG. 2 is depicted. One difference between FIG. 2 and FIG. 3 lies in the fact that a liquid fuel is used in FIG. 3 instead of a gaseous fuel, and the coil has therefore been entirely omitted. Apart from that, FIG. 3 is used to illustrate the acoustic components of the combustor rather than to focus on the structural, aerodynamic or thermodynamic requirements, since an understanding of the acoustic operating principles of the combustor is useful to understand the improvements. For clarity, reference numerals in the one hundred series will be used to identify corresponding elements in FIG. 3. It will be understood by those skilled in the art of acoustics that the requirements to guide pressure waves of sound are much different from the requirements to guide fluid mechanics, and that some structural changes which may greatly affect the visual geometry of components may affect their acoustic behaviour only negligibly.

Referring to FIG. 3, the body 12 and the intake system 14 of the pulse combustor 10 (FIG. 2) can be seen to define an acoustic cavity 110. The body 12 (FIG. 2) acts as an acoustic resonator 112 which may in some ways be compared to a closed cylinder air column, and thus bearing resemblance to a wind instrument such as the clarinet. The resonator 112 can be said to have a fundamental resonance frequency similar to that of a closed cylinder air column. The fundamental resonance frequency of the resonator 112 is thus a function of the length of the resonator 112 and a function of the speed of sound. Since the speed of sound is a function of temperature, and the temperature changes both as a function of position and time, the speed of sound varies depending of the position in the resonator 112. The combustion chamber (22) is typically warmer than the exhaust pipe (18). The temperature varies over time with the operating cycle of the combustor, therefore in the instant description, when reference is made to a resonance frequency, it is understood that what is meant is average resonance frequency. This resonance frequency may be quite different than the resonance frequency at ambient temperature, especially when referring to the combustion chamber 22, exhaust pipe 24 and intake tube 36.

Typically, the pulsating frequency of the combustor 10 coincides with the resonator fundamental frequency, although it is envisaged that the combustor 10 could alternately pulsate at a harmonic of the resonator fundamental frequency, such as the third harmonic for example. It is the important pressure variations at the pulsating frequency in the combustion chamber that drive the main combustor operating cycle. For indicative purposes, the pulsating frequency of one example of a pulse combustor was of about 145 Hz.

Figure 4:
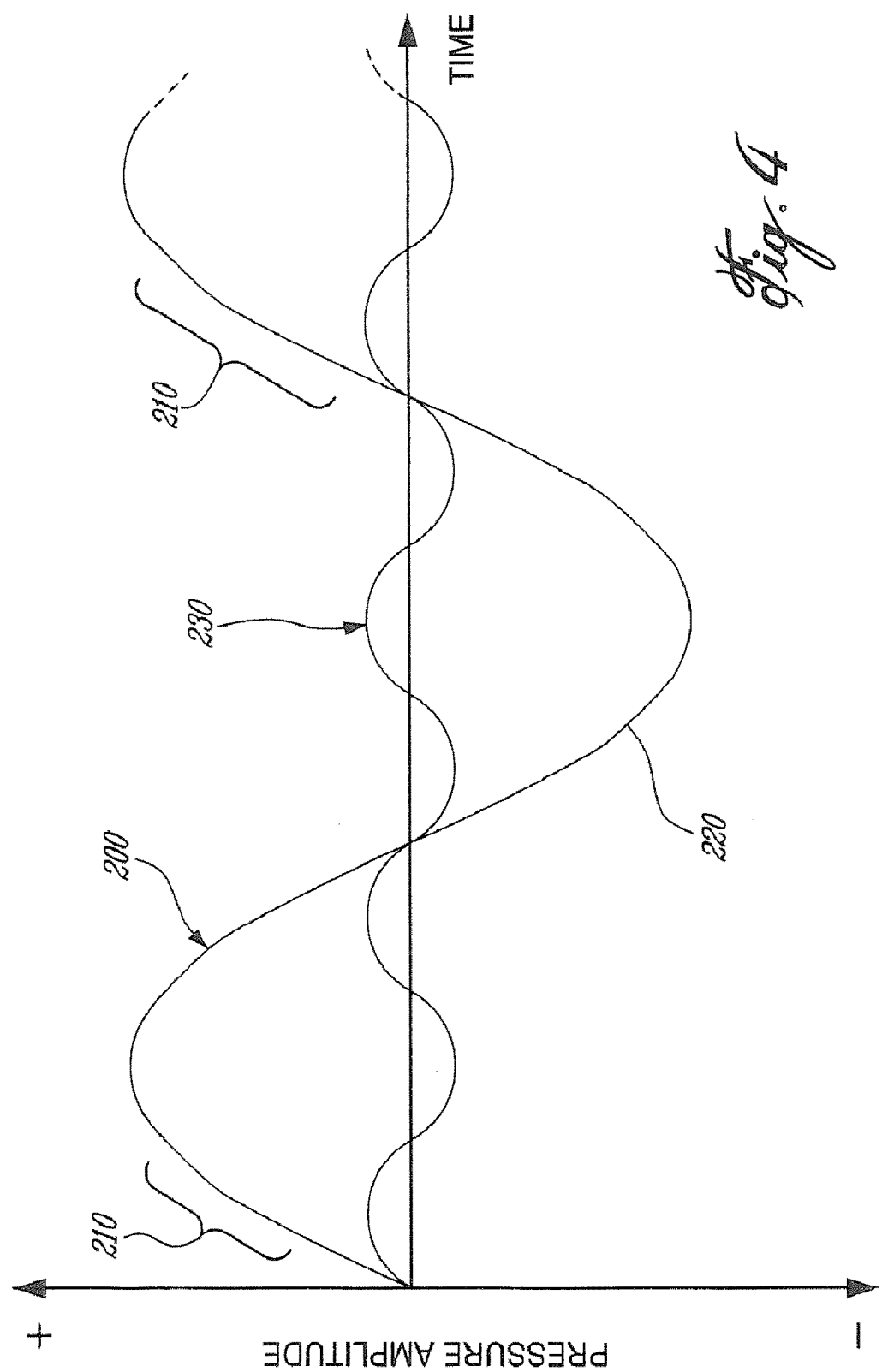
FIG. 4 is a schematic view illustrating variations in pressure over time in the pulse combustor of FIG. 1.

In FIG. 4, the pressure variations at pulsating frequency 200 are schematically depicted as a sinusoidal curve, although it is understood that the actual pressure variations depart from this curve. Combustion mainly takes place during the rising pressure portion 210 of the cycle and a negative pressure portion 220 of the cycle follows. During the negative pressure portion 220, air and fuel enter the combustion chamber 22 through the inlet 26 (FIG. 2). Although the combustion mainly occurs during the positive portion 210 of the cycle, some combustion lingers on during the negative pressure portion when the combustor is warm, especially near the wall of the combustion chamber 22, perhaps due to boundary layer effect. Once the pressure rises, the fresh air/fuel mixture present in the combustion chamber 22 is ignited by the boundary layer and combustion or more precisely, an explosion occurs. The energy deployed by the cyclic explosions adds to the resonance frequency of the resonator and helps sustain this resonance in a manner similar to how the edge-tone principle generates energy which contributes to sustain the resonance in some musical wind instruments.

To maintain a satisfactory flow of air and fuel into the combustion chamber 22, it is desired that the velocity impulse from the positive pressure pulses 210 of the explosion be guided to exhaust through the exhaust pipe 24 rather than through the intake system 14. One way to contribute to this goal is to augment the ejecting action of the ejector and to use the momentum of fuel and air in the first tube 40 and second tube 42 to counter the pressure pulses exiting the intake tube 36. In the following discussion, this way, and other ways to contribute to this goal will be discussed.

To reduce the travel of the pressure pulses or waves through the inlet 26 and intake system 14 at the pulsating frequency, it is desired to increase the intake system impedance at that frequency. One skilled in the art of acoustics is aware of basic acoustic filter theory and will recall that an acoustic high-pass filter can be constructed using a T junction or a side-branch opening in a duct or pipe. If both the radius and the length of the side branch are smaller than a wavelength of the plane waves in the duct then the acoustic impedance of the side-branch opening becomes a function of the side-branch opening area and of the side-branch length.

Figure 5:
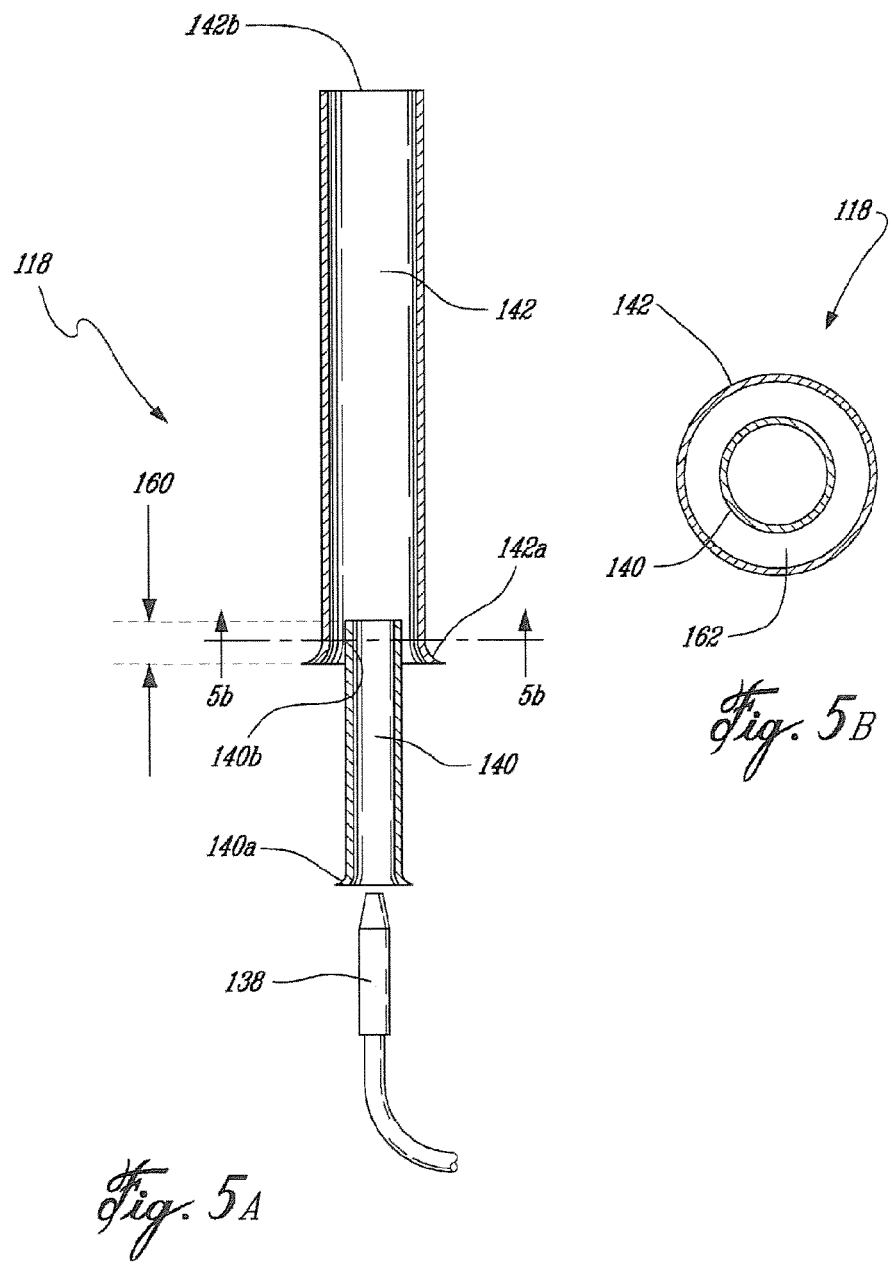
FIG. 5A and FIG. 5B are a side and a top cross-sectional views, respectively, showing the ejector system of the pulse combustor of FIG. 1.

Turning back to FIG. 3, it is seen that in the intake system 14 (FIG. 2), the intake tube coupling 148 includes an adjustment of penetration depth and area difference. Although the visual appearance of the coupling 148 between these tubes is much different from the appearance of a side branch in a straight pipe, it was found that the acoustic behaviour is actually quite similar, with the difference of area between the second tube and the intake tube being equivalent to the opening area of the side branch, and the penetration depth of the second tube into the intake tube being equivalent to the length of the side branch. The coupling 148 between the second tube and the intake tube can therefore act as a precisely selected high-pass filter 114 if the penetration depth and the difference of area are precisely chosen. A similar discussion can be made of the coupling 146 between the first tube 140 and the second tube 142. In FIGS. 5 A and 5B, the penetration depth 160 of the first tube 140 into the second tube 142 and the difference of area 162 between the first tube 140 and second tube 142 are identified for further clarity.

Referring to FIGS. 5A and 5B, it will be discussed how to enhance the ejecting action of the ejector system 118. A first point which may be made is that as it is known to those skilled in the art of fluid mechanics, a well rounded inlet creates less energy loss and eases the penetration of fluid relatively to a sharp edged inlet. This phenomenon is used advantageously in the case of the first and second tubes (140, 142) which have rounded inlets (140a, 142a) and straight edge outlets (140b, 142b). Hence the impedance to a flow of air is greater when traveling into the outlet than when traveling into the inlet, and thus contributes to enhance the ejecting action.

One parameter to consider when adjusting the ejecting action of the ejector system 118 is the adjustment of the position of the nozzle 138 relative to the first tube inlet 140a. Typically, a small gap will be present between the nozzle 138 and the first tube inlet 140a. One can contemplate the effect of the position of the nozzle 138 by monitoring the amount of fluids ejected from the second tube outlet 142b.

Furthermore, it will be understood that the first tube 140 and the second tube 142 act as open ended cylinders acoustically and that as such, they have a fundamental resonance frequency which is a function of the length of the tube in addition to being a function of the speed of sound. However, the diameter of the tube does not have much influence on the acoustics. For aerodynamic, fluid mixing and momentum considerations, the second tube will generally be chosen to be longer than the first tube and will therefore have a lower fundamental frequency. It was found that most supersonic fluid nozzles (which are fuel nozzles when the ejector system 18 is used with the pulse combustor 10) generate pressure vibrations while they inject fluid. Of three possible fluid nozzle types, both the over-expanded and under-expanded types produce pressure vibrations. It was found that when using a typical over-expanded nozzle, high amplitude and high frequency pressure waves (or noise) resulted which excited the first tube 140 into resonance. In turn, the resonance of the first tube 140 enhanced the ejecting action of the first tube. The fluid nozzle 138 therefore acted as a high-frequency noise generator having a frequency and amplitude suitable to acoustically excite the first tube 140. It was found that by selecting a first tube 140 having a fundamental resonance frequency which was a harmonic of the second tube fundamental resonance frequency, the resonance of the first tube 140 was transmitted to the second tube 142 and excited the second tube 142 into resonance. In the tests, the first tube fundamental resonance frequency were selected to be the third harmonic of the second tube fundamental resonance frequency. The resonance of the second tube 142 further enhanced the ejecting action of the injector.

Similarly, if a third tube is coupled to the second tube, such as an intake tube for example, the resonance frequency of the third tube can be selected to be in tune with the resonance frequency of the second tube.

In this specification, the term sub-harmonic is used to designate the inverse of a harmonic For example, if the first tube has a fundamental resonance frequency which is the third harmonic of the second tube fundamental resonance frequency, the second tube fundamental resonance frequency can be said to be at the third sub-harmonic of the first tube fundamental resonance frequency. The expression in tune indicates that the resonance frequency of a first element is either the same, a harmonic of, or a sub-harmonic of the resonance frequency of a second element.

Comparing FIGS. 2 and 3, another acoustic component which may advantageously be used with the combustor 10 is to use a combustion chamber 22 shaped to act as an oscillator 122. The nose-cone 30 of the combustion chamber 22 acts as a same-phase reflector 130 to the acoustic pressure wave caused by the explosion. Furthermore, using the nose cone 30 shape instead of a flat end is advantageous because it flattens out the incoming pressure wave, diminishing the amplitude and increasing the period with the reflection. The converging section 32 of the combustion chamber 22 acts as a partial inverse-phase reflector 132 which reflects a portion of the outgoing pressure wave back into the oscillator 122 with the opposite phase. The combined action of the reflector 130 and the partial reflector 132 is to trap and magnify a frequency which is higher than the pulsating frequency in the oscillator 122. The oscillator 122 can thus be said to also have its own fundamental resonance frequency. By adjusting the length of the oscillator 122 taking into account the speed of sound at operating temperatures, the fundamental resonance frequency of the oscillator 122 can be selected to be a harmonic of the pulsating frequency of the resonator 112. Due to the closed-end cylinder acoustic characteristics of the resonator 112, the odd harmonics are favoured. Typically the third harmonic is selected, although it will be understood that another harmonic such as the fifth harmonic can also be selected.

In FIG. 4, an exemplary sinusoidal curve 230 representing the oscillator 122 resonating at the third harmonic of the pulsating frequency 200 is shown, although it will be understood that the actual pressure curve may depart somewhat dramatically from this sinusoidal curve illustration. In the combustion chamber 22, the pulsating frequency 200 and the oscillator frequency 230 are superposed, which gives rise to a resulting curve which has a more complex form. Other harmonic frequencies and noise are also present in an actual pulse combustor 10 during operation.

The resonator 1 12 therefore acts as a low-pass filter 112a allowing the pressure waves at the pulsating frequency out of the combustion chamber 22 and through the exhaust pipe 24, but at least partially maintains the pressure waves at the oscillator resonance frequency in the oscillator 122. The cut-off frequency of this low-pass filter 112a can be said to be between the pulsating frequency and the oscillator frequency.

The oscillator 122 can also be said to have an acoustic center 123 where the oscillator pressure variations are optimized. This acoustic center 123 may somewhat depart from the longitudinal center of the combustion chamber. For instance, if a gas fuel is used and a coil 50 is present in the aft portion (32) of the combustion chamber 22, the coil 50 will decrease the mean temperature in that portion of the combustion chamber 22, therefore lowering the speed of sound in that portion relatively to the fore portion (30) of the combustion chamber 22. As a result, the acoustic center 123 will be shifted toward the fore portion of the combustion chamber 22 relatively to the longitudinal center.

It is understood that the intake tube 36 can be seen from one acoustic perspective as an open cylinder resonator. The diameter and the length of the intake tube 36 are guided by aerodynamic, thermodynamic and momentum considerations. However, it has been found that by using an intake tube having a length giving a fundamental resonance frequency which is equal to the oscillator resonance frequency or a harmonic thereof results in the oscillator driving the resonance of the intake tube. Furthermore, the length of the equivalent acoustic cylinder formed between the nose cone tip and the intake tube outlet, and the length of the equivalent acoustic cylinder formed between the small end of the converging section and the intake tube outlet are chosen to have acoustic resonance frequencies which are harmonics of the pulsating frequency.

The resonance of the intake tube 36 contributes to maximize the ejecting action of the ejector 18. To maximize the resonance-driving effect of the oscillator 112, the penetration depth and the area difference defining the acoustic coupling 148 between the second tube 142 and the intake tube 136 and the acoustic coupling 146 between the first tube 140 and the second tube 142, can be selected to create a high-pass filter 114 in which the cut-off frequency is between the pulsating frequency of the resonator 112 and the resonance frequency of the oscillator 122. Another factor to influence the resonance-driving effect of the oscillator 122 is to place the combustion chamber inlet 26 (thereby placing the intake tube outlet 36b) at the longitudinal acoustic center 123 of the oscillator/combustion chamber.

Another factor in increasing the acoustic impedance of the intake tube 36 to the pressure pulses from the explosions in the combustion chamber is to give a funnel shape to the intake tube 36 by making it a converging section with the larger end acting as the outlet 36b and being connected to the combustion chamber inlet 26.

The result is that the arrangement of acoustic components as shown in FIG. 3 defines an acoustic cavity 110 which can advantageously be used in a pulse combustor 10 because the resonance frequencies can be chosen in a manner in which they interact during combustor operation to obtain increased combustor efficiency, power or thrust.

Typically, when the combustor 10 is started, the temperature of the combustion chamber 22, intake tube 36 and exhaust pipe 24 are below the normal operating temperatures, and the resonance frequencies will be out of tune. The combustor will start with a lower power output until the components are heated up and a steady-state regime is reached and sustained.

Figure 6:
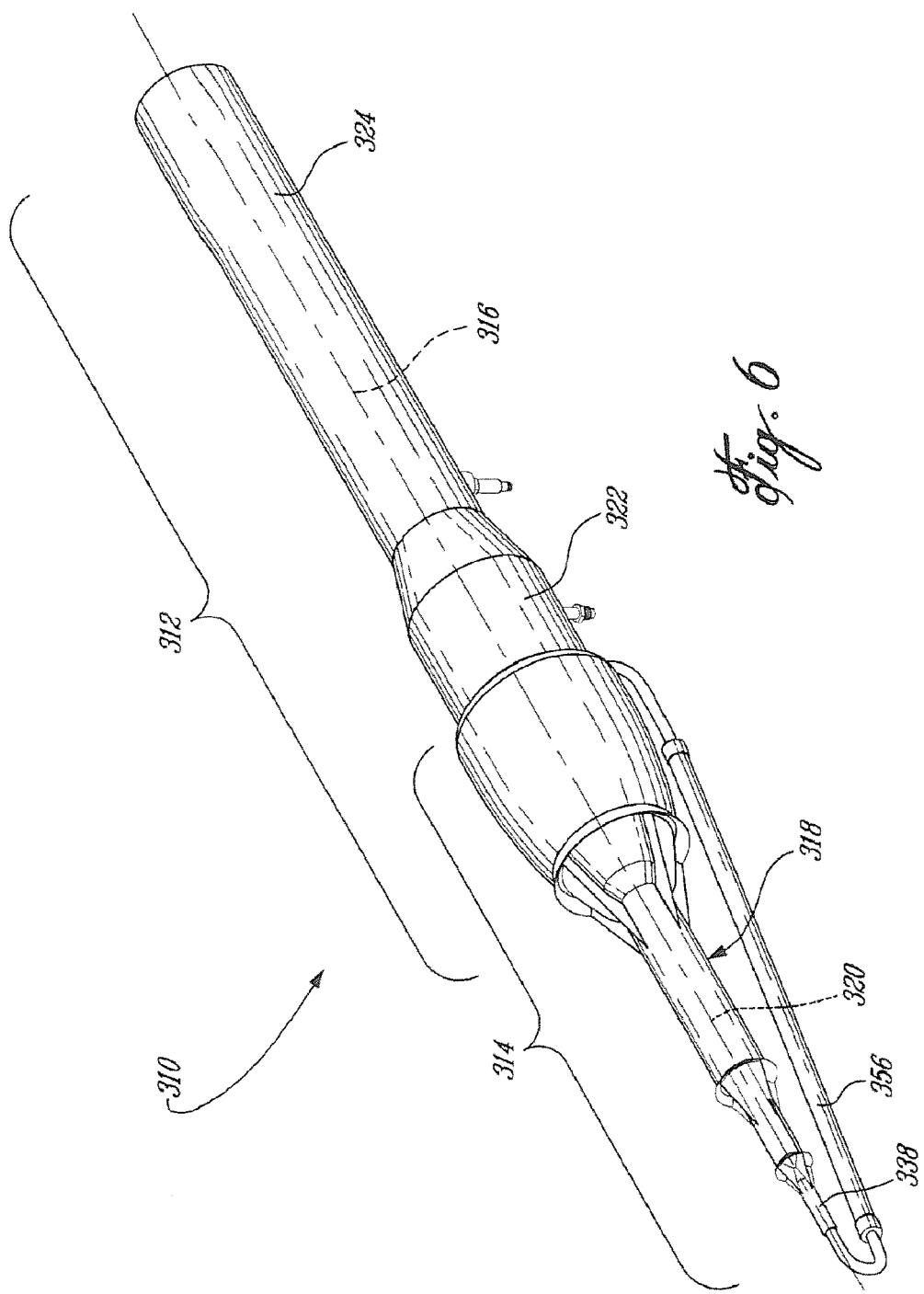
FIG. 6 is a perspective view of an in-line combustor in accordance with the improvements.

Turning now to FIG. 6, an example of another configuration of a combustor 310 is shown, which will be referred to herein as the "in-line configuration". For clarity, this in-line combustor 310 will be described using reference numerals in the three hundred series. Similarly to the L-shape pulse combustor 10 shown in FIG. 1, the in-line combustor 310 also includes a body 312 generally disposed on a main axis 316 and an intake system 314 disposed on an intake axis 320.

However, in the case of this in-line combustor 310, the intake axis 320 and the main axis 316 coincide and the intake system 314 is oriented away from the body 312 in a direction opposite from the direction of the exhaust pipe 324. As it will be understood, this in-line configuration procures some significant advantages relative to the L-shape configuration, especially when the combustor is used as an engine for propulsion, rather than as a burner for hot air generation.

In FIG. 6, the in-line combustor 310 uses gaseous fuel as it can be understood from the fuel line 356 which extends between the fuel nozzle 338 and a coil (not shown) in the combustion chamber 322. This feature is similar to the features illustrated in FIG. 2. However, it will be understood that a liquid fuel can also be used and that the coil can be omitted. For simplicity, this latter case is illustrated in FIGS. 7 and 8.

Figure 7:
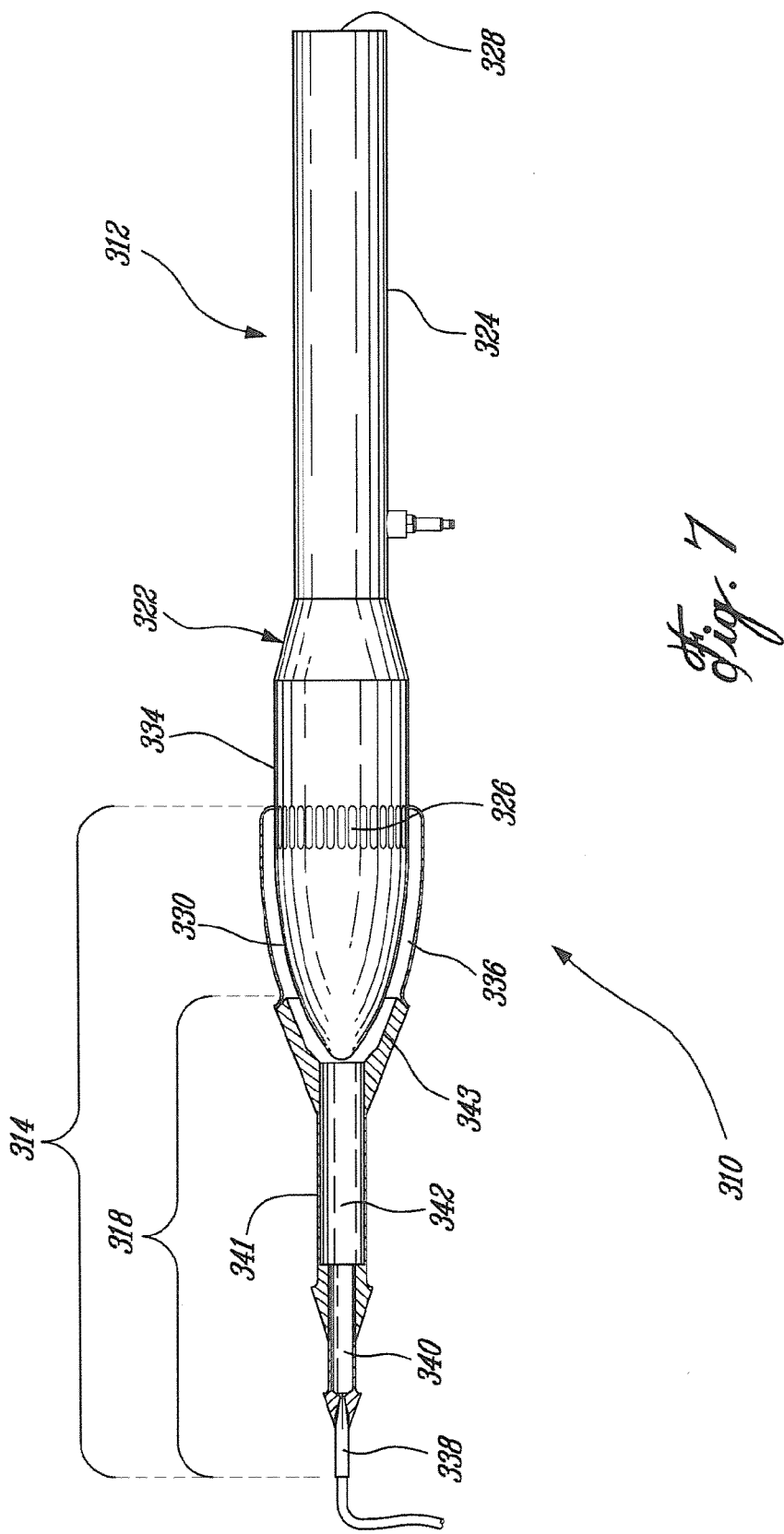
FIG. 7 is a cross-sectional view of the combustor of FIG. 6 showing the structural elements thereof.
Figure 8:
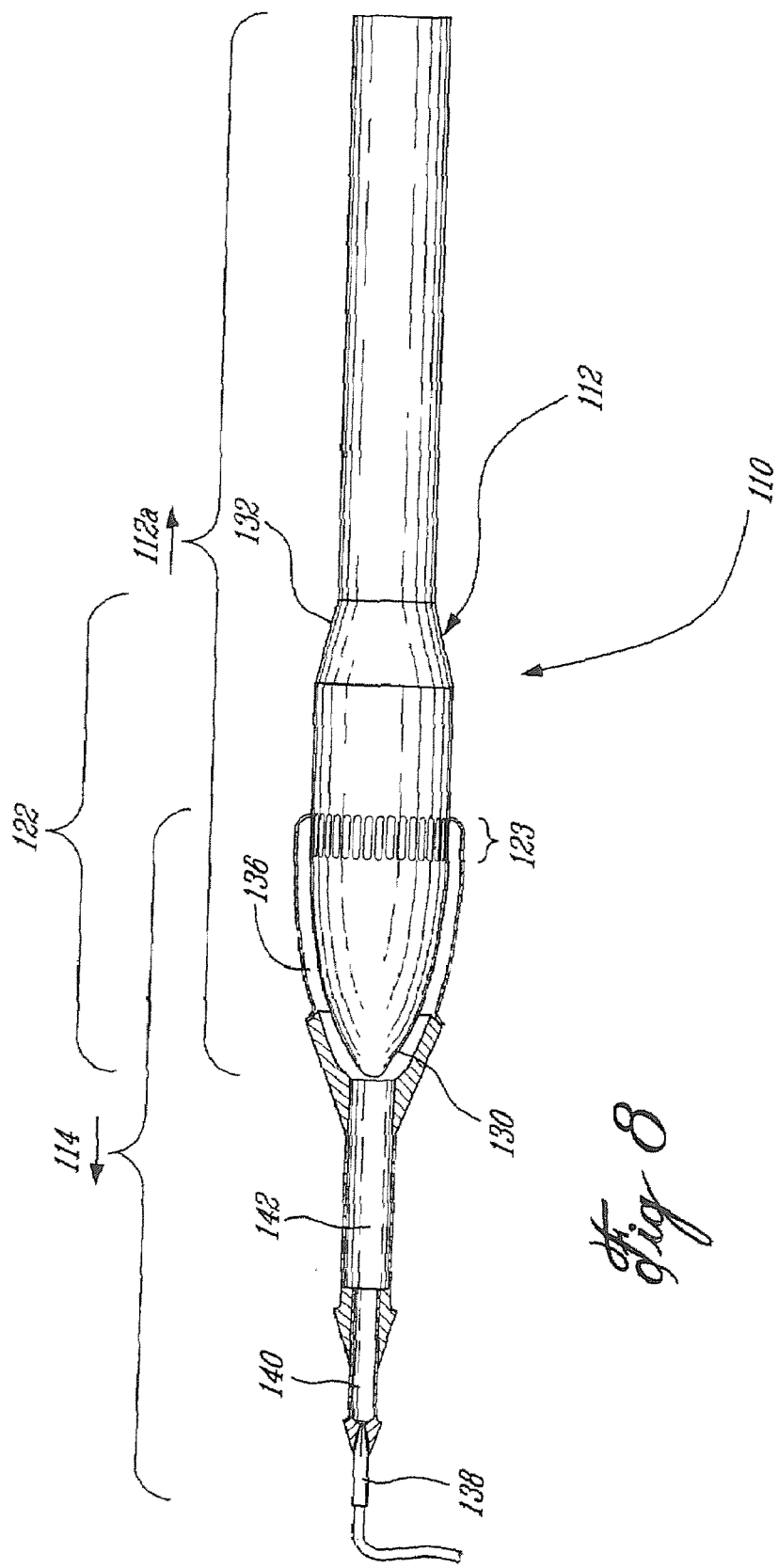
FIG. 8 is a cross-sectional view of the combustor of FIG. 6 showing the acoustic elements thereof.

Referring to FIGS. 6, 7 and 8, it can be seen that at least some of the structural and acoustic components of the in-line combustor 310 are equivalent to the structural and acoustic components of the L-shaped pulse combustor 10 illustrated in FIGS. 1, 2 and 3, without limiting the advantages of this in-line configuration in terms of performance and additional capabilities. For the sake of clarity and simplicity, the in-line combustor example will therefore be described on the basis of comparisons made relative to the L-shape pulse combustor 10 example.

Like the L-shape pulse combustor 10, the in-line combustor 310 also includes a body 312 which has a combustion chamber 322 connected to an exhaust pipe 324, with an outlet 328 in the exhaust pipe 324 and an inlet 326 in the combustion chamber 322. However, in this example, the inlet 326 is peripheral to the combustion chamber 322 instead of being an aperture 26 on one side of the combustion chamber 22 as was the case for the L—shape combustor 10.

Furthermore, like in the case of the L-shape combustor 10 example, the in-line intake system 314 also basically functions on the principle of an ejector and includes an ejector system 318 with a supersonic fuel nozzle 338, a first tube 340 and a second tube 342. Instead of being simply cylindrical, the second tube 342 has a cylindrical portion 341 and a flared end portion 343 which covers a portion of the nose cone 330. The cross-sectional area defined between the nose cone 330 and the flared portion 343 is substantially equal to the cross-sectional area of the cylindrical portion 341. The intake system 314 also includes an intake tube 336, but the intake tube 336 in this case has the shape of a cowl that covers the portion of the combustion chamber 322 extending from the peripheral inlet 326 and the outlet 342b of the second tube 342. The cross-sectional area between the combustion chamber 322 and the intake tube 336 can be chosen to be equivalent to the cross-sectional area of the cylindrical intake tube 36 which was used in the L-shape combustor example (FIG. 1), for example. In this case, the intake tube 336 overlaps a portion of the second tube 342, and it will be understood that this overlap distance equates the penetration distance 160 (FIGS. 5 A and 5B) and can be selected together with the area difference 162 to achieve desired filtering characteristics, as can be seen from the discussion above.

One skilled in the art will understand that the choice of the irregular shape of the second tube 342 and intake tube 336 has only a minimal influence on the acoustic, aerodynamic and momentum characteristics of these components. These irregular shapes are a good example of how the structural shape of certain components of the combustors 10, 110, 310 can be greatly varied while not substantially affecting their function in combustor operation. This should serve as an illustration of how the reader of the instant specification must bear in mind the essential acoustic, aerodynamic and/or momentum characteristics of the combustor components rather than to only look at the simple structural characteristics or visual appearance of the combustor components.

One special feature of the in-line configuration is that the intake system 314 can benefit from the effect of rain air when the engine is displaced in the surrounding air. During engine displacement, surrounding air is "caught" in the area between the fuel nozzle 338 and the first tube 340, in the area between the first tube 340 and the second tube 342, and the area between the second tube 342 and the intake tube 336. This ram air increases the amount of air flow through the intake system 314, which opposes the direction of the pressure pulses in the intake tube 336. This rain air can thus be used to increase combustor efficiency.

When ram air is used with the intake system 314, the combustor 310 can enter a mode which will be referred to herein as the rain mode. During the transition to the rain mode, the pulsating frequency can vary. In the ram mode, the acoustic considerations can become of lesser importance relatively to other aerodynamic and thermodynamic considerations.

Referring now to FIGS. 9A to 9E, discussion will be made of the peripheral inlet to the combustion chamber. One will understand that when designing the inlet (26 or 326 for example) of a combustor, one attempts to satisfy various requirements. First, the inlet should have a sufficient overall size (area) so as to allow a satisfying amount of air and fuel to flow into the combustion chamber. To enhance the acoustic interaction between the intake tube and the oscillator as was discussed above, the inlet should have a sufficient longitudinal length to allow the longitudinal waves reflected from the reflector and the partial reflector to form appropriate waves in the intake tube. Furthermore, one does not wish that the overall area defined by the combustion chamber inlet be too important because this has the effect of lowering the impedance of the intake tube to the pressure pulses from the pulsating frequency and consequently increases the amount of discharge through the intake tube at the expense of the amount of thrust or hot air discharge through the exhaust pipe.

To satisfy the requirement of inlet overall size and inlet longitudinal length along the combustion chamber discussed above, it has been found advantageous to provide the inlet 326 as a plurality of apertures. In this example, the apertures are slots 327 which are tangentially interspaced around the combustion chamber wall relative to the main axis 316 (FIG. 6). The slots 327 can be longitudinally oriented to optimize their actual longitudinal length. Alternately, they can be somewhat angled. Further, to maximize the acoustic interaction between the intake tube 336 and the oscillator 122 formed by the combustion chamber 322, the slots 327 can be longitudinally positioned at the acoustic center 323 of the oscillator. The main acoustic length of the intake tube 336 can then be calculated from the inlet 336a to the nearest end 327a of the longitudinal slots 327. In other examples, the apertures can be provided as tangentially spaced sets of longitudinally aligned apertures, or in other aperture configurations which are not necessarily longitudinally aligned but which satisfy similar acoustic and aerodynamic criteria.

One way to further enhance intake flow through the slots 327 and to reduce backflow from the combustion chamber 322 is to provide the slots with a rounded edge 327b which penetrates into the combustion chamber 322. This is more clearly shown in FIGS. 9B and 9C. The backflow is thus faced to a re-entrant edge having a high loss coefficient, whereas the intake flow faces a rounded edge having a low loss coefficient. Flow into the combustion chamber 322 is thus favoured relative to backflow. This configuration can be realized in sheet metal by punching the slots 327 in prior to rolling the cylindrical section 334 of the combustion chamber 322, for example.

Figure 9A:
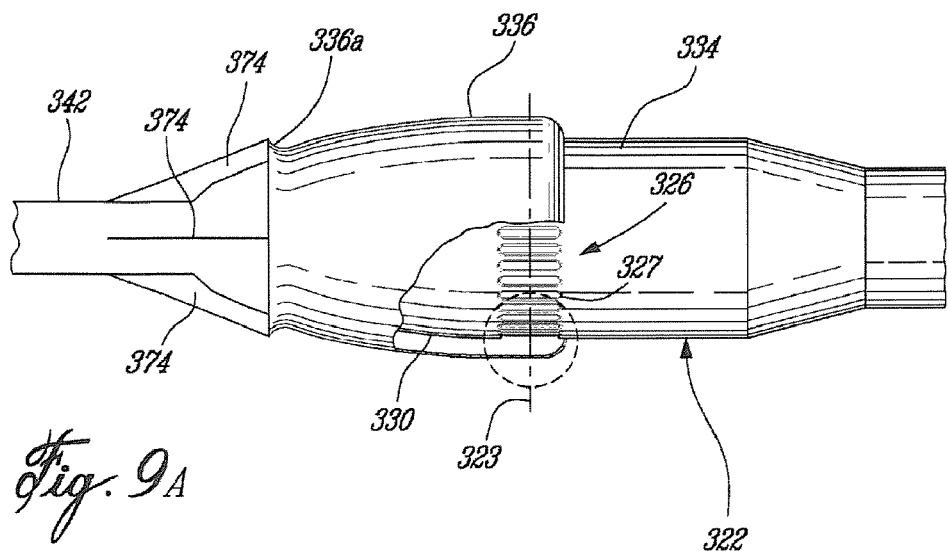
FIG. 9A is a side views, partly sectioned and enlarged, showing the slotted inlet of the combustor of FIG. 6.
Figure 9B:
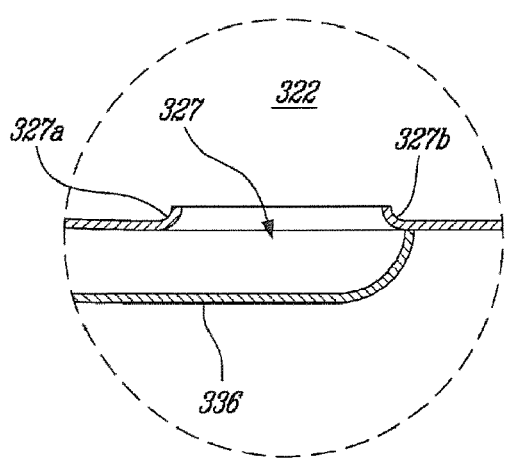
FIG. 9B is an enlarged view of the slotted inlet of FIG. 9A.
Figure 9C:
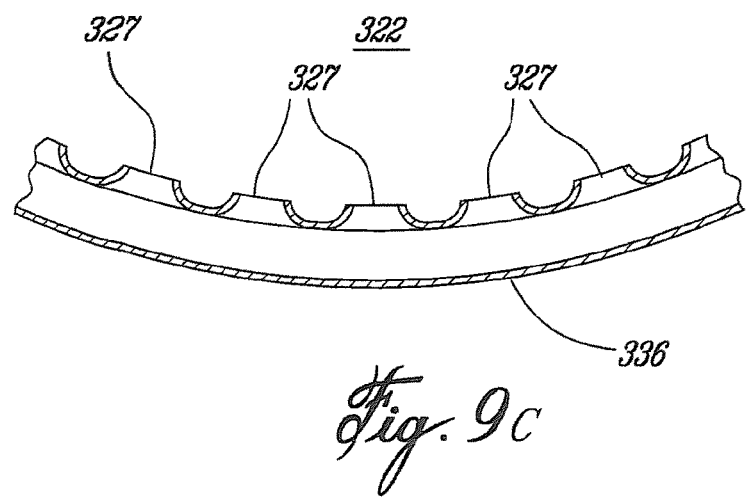
FIG. 9C is a front cross-sectional view of the slotted inlet of FIG. 9A.

In the example illustrated in FIGS. 9A to 9C, the rounded edges of the slots are oriented generally perpendicularly to the combustion chamber wall or to the combustor central axis.

Figure 9D:
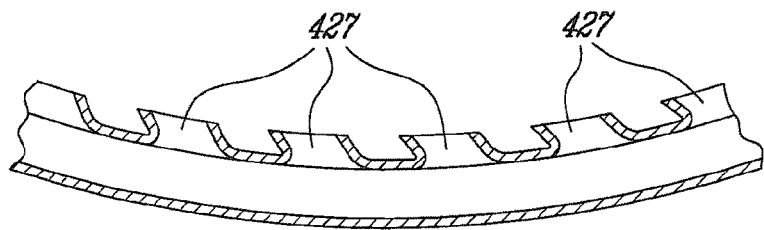
FIG. 9D is a front cross-sectional view of an alternative to the slotted inlet of FIG. 9A.
Figure 9E:
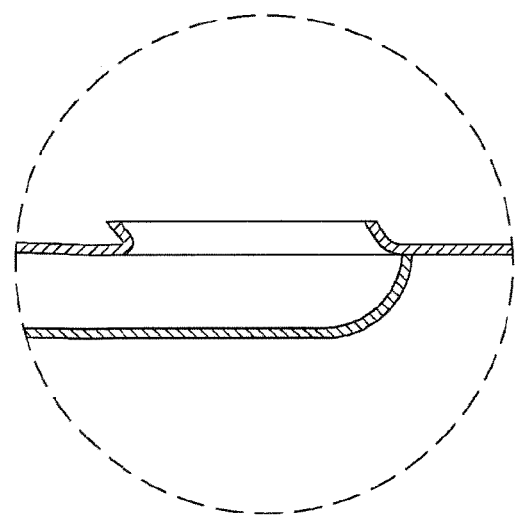
FIG. 9E is a side cross-sectional view of an alternative to the slotted inlet of FIG. 9A.

However, it will be understood that to favour a vortex flow, the rounded edges of the slots can be tangentially slanted relatively to the combustion chamber wall or the central axis, in a common tangential direction, such as the slots 427 shown in FIG. 9D for example. This changes the configuration of the penetrating flow of fuel and air, and can increase the resistance to backflow. In FIG. 9E, it is shown that the slots 427 can also have edges which are longitudinally slanted.

Figure 10:
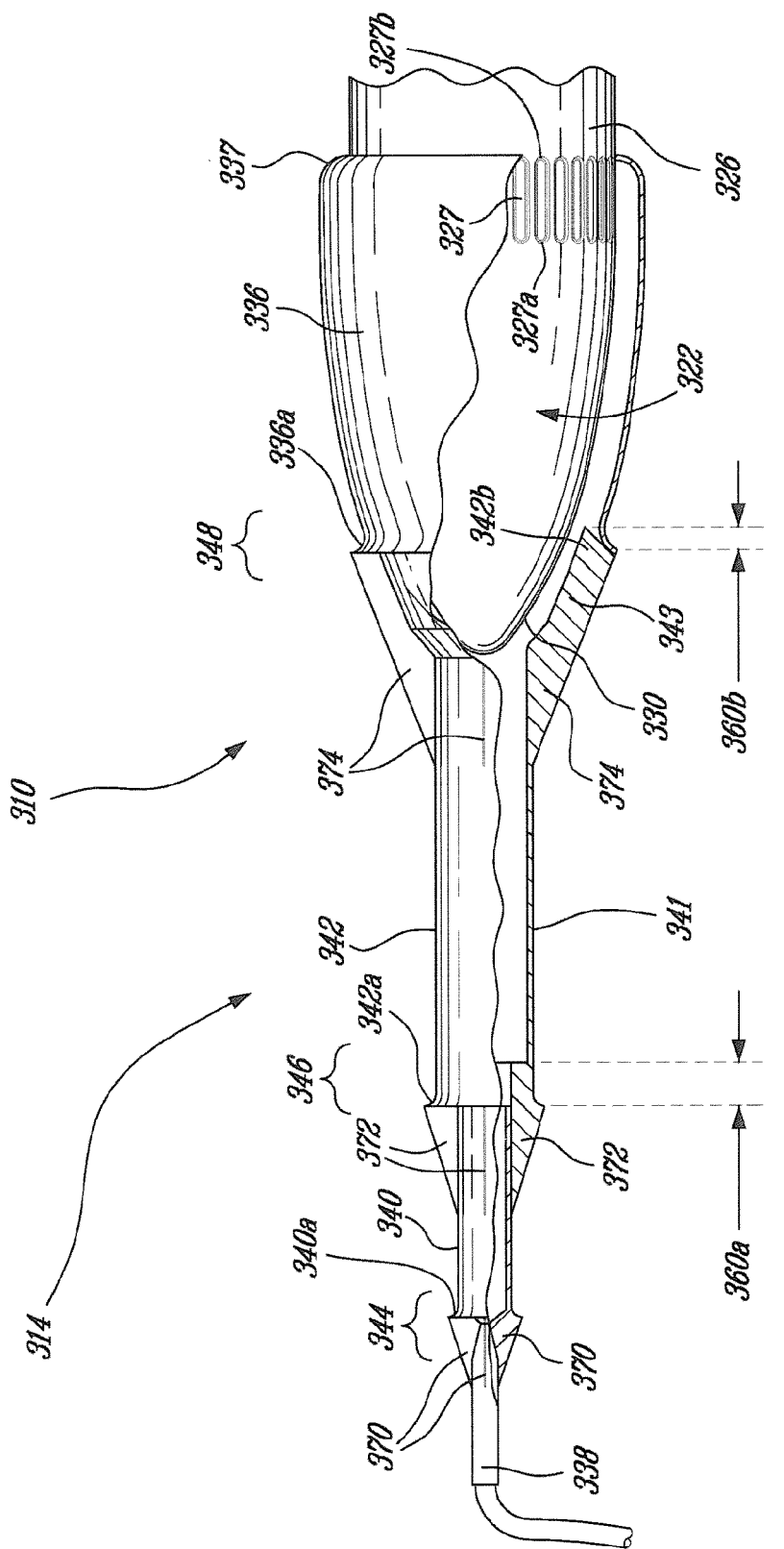
FIG. 10 is a side view, partly sectioned, showing t le intake system of the combustor of FIG. 6.

Referring to FIG. 10, it can be seen that in this example of an in-line combustor 310, the intake system 314 is held into position by a plurality of fins 370, 372, 374. In the example, four fins are used between each two components. The fins 370, 372, 374 are longitudinally oriented and are made thin in order to minimize their resistance to inflowing air. For the first tube coupling 344, first tube fins 370 connect the first tube inlet 340a to the nozzle 338. For the second tube coupling 346, second tube fins 372 connect the second tube inlet 342a to the first tube 140. For the intake tube coupling 348, intake tube fins 374 connect the intake tube inlet 336a to the flared end portion 343 of the second tube 342. The end 337 of the intake tube 336 can be welded directly to the combustion chamber 322, slightly past the far end 327b of the slots 327. The penetration depth 360a of the first tube into the second tube and the penetration depth 360b of the second tube into the intake tube are also identified. If the intake system 314 is made of metal tubes and nozzle, the fins can be affixed by welding. It will be understood that this latter structural configuration is an example only and that many other ways to hold the components of the intake system into operating position can alternately be used.

Turning now to FIGS. 11A to 11C, an alternate configuration of a combustor 510 is shown. In this example, the combustion chamber 522 also has a plurality of apertures interspaced near an acoustic center thereof, and in this case, the apertures are also longitudinally oriented slots 527. The slots 527 also define an inlet 526 to the combustion chamber 522 and the intake system 514 is connected to this inlet 526. However, in this configuration, the slots 527 are disposed around the intake tube 536, and the intake tube 536 penetrates into the combustion chamber 522. In the illustrated configurations, the intake tube 536 has a closed end. In FIG. 11B, the closed end is a flat end 529, whereas in FIG. 11C, the closed end is a rounded end 531. In these examples, the intake system 514 is aligned with the axis of the body 512 and is oriented opposite the tail pipe 524. The combustion chamber 522 has a flat front end 530 instead of the nose cone shown in the preceding examples. The flat front end 530 bridges and closes the opening between the end of the straight section 534 and the intake tube 536.

Figure 12:
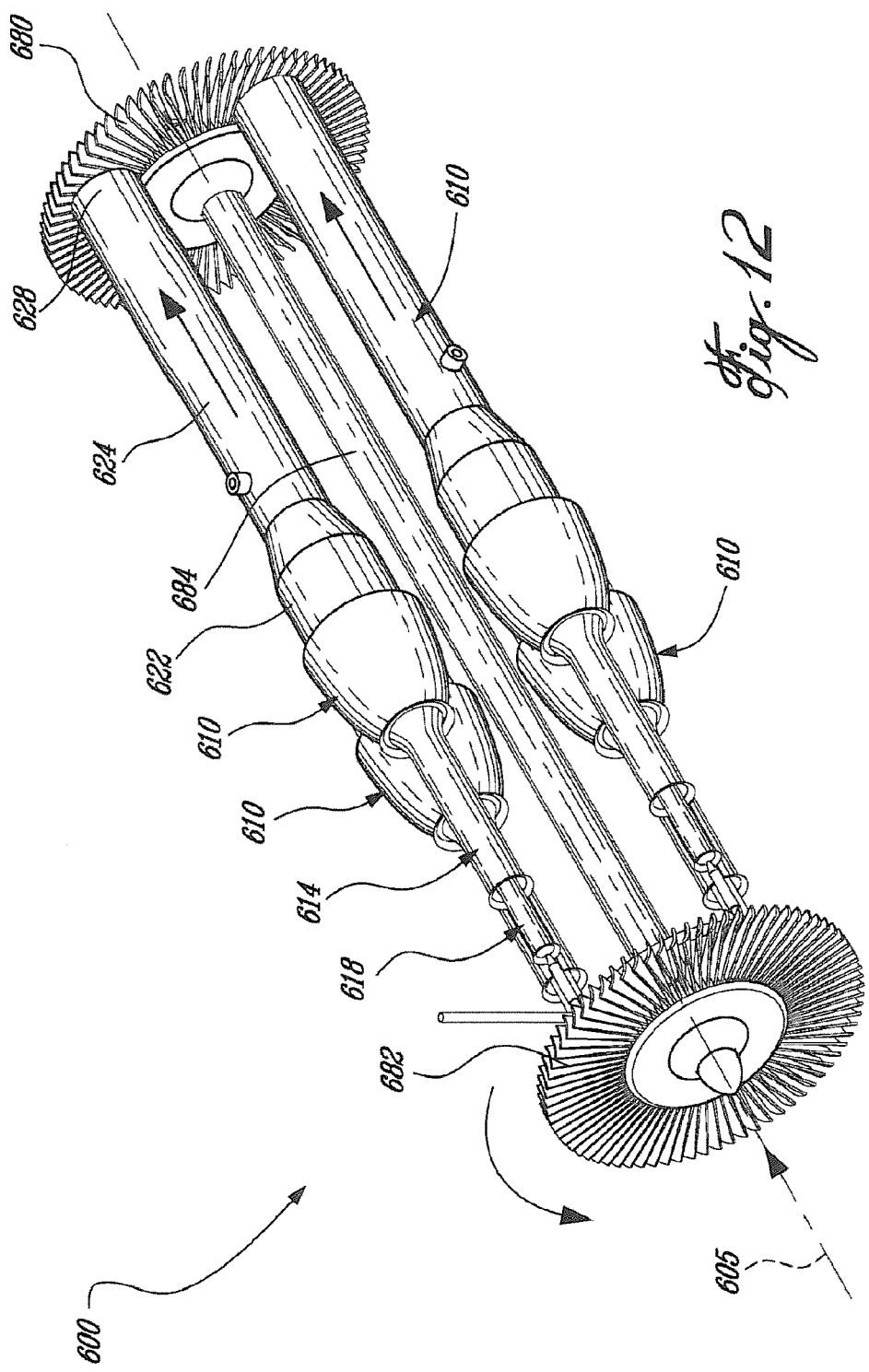
FIG. 12 is a perspective view showing a turbine engine using a plurality of in-line combustors.

Turning now to FIG. 12, a schematic view of a turbine system 600 to recuperate energy from the hot gasses exhausted by in-line combustors 610 is shown. The combustors 610 are aligned with their axes being circumferentially interspaced around a central axis 605. A power turbine 680 is positioned at the outlet 628 of the in-line combustor exhaust pipes 624. A fan 682 is positioned ahead of the in-line combustor intake systems 614 and is connected to the power turbine 680 by a shaft 684 along the central axis 605. In operation, the power turbine 680 rotates by extracting power from the combustion gasses and transmits the rotation to the fan 682 via the shaft 684. The fan 682 thus generates a stream of air which adds to the ejecting action of the ejector system 618 and increases the flow of air into the combustion chamber 622. Other turbine-based systems to recuperate energy from the combustion gases may alternately be used as well.

It shall be noted here that although combustors having generally cylindrical bodies were described above, other shapes can be used instead. For example, the combustion chamber and body can be made with a generally ellipsoidal cross-section in order to make them somewhat flatter. Further, although the use of the slotted intake was found satisfying in the in-line combustor described above, other types of apertures can be used instead. In one alternate embodiment, an annular slot making the entire periphery of the combustion chamber can be used instead of the plurality of slots. In a case where the combustion chamber has an ellipsoidal cross-section, a separate aperture on each respective flat side of the combustion chamber can be used instead of the plurality of slots, for example.

Further, although an intake system using three stages defined by the first tube, second tube and intake tube was used in the examples above, it is to be understood that a different number of stages can also be used.

Figure 13:
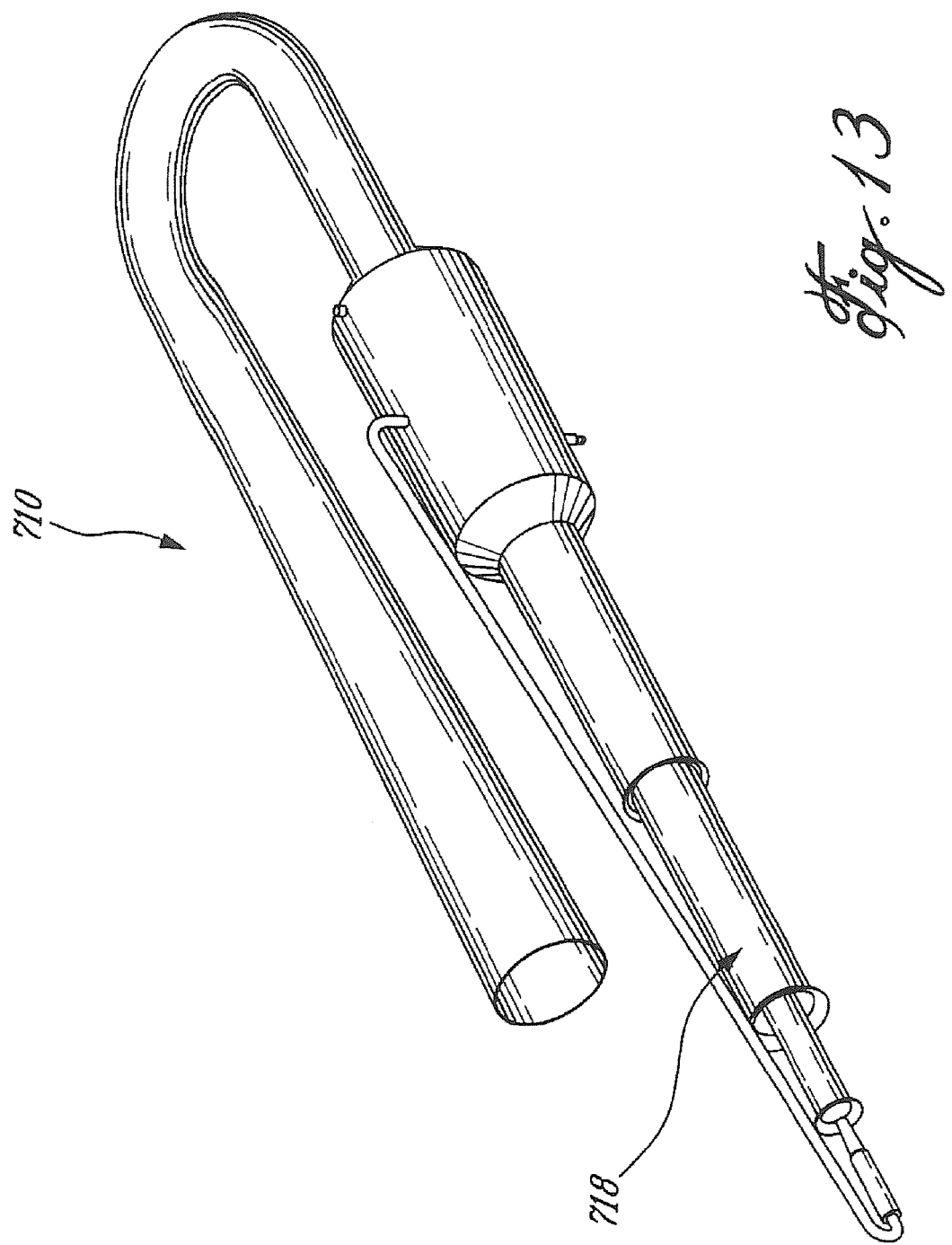
FIG. 13 is a perspective view of a Hiller-Lockwood engine having the ejector system of FIG. 5A.

The ejector system described above can be used in other applications than in an intake system. It can also be used in other types of intake systems. For example, in FIG. 13, an ejector system 718 is shown on an engine known as the Hiller-Lockwood engine 710.

In the tests, combustors were made of steel. However, other materials can be used as well. One consideration is that the materials used have suitable acoustic properties. One other consideration is that the materials used have sufficient resistance to heat, especially for the combustion chamber and exhaust pipe.

In the example given above, the ejector system was used to eject a mix of fuel and air and was made part of an intake system of a combustor. However, it is believed that many other applications can also be made to the acoustically enhanced ejector system. It can be used with fluid nozzles which inject other types of fluids which may or may not be fuel, and with different ambient fluids. In the examples given above, the injected fluid was fuel and the ambient fluid was air.

It will be noted that other types of intake systems can be used to feed fuel and air to a combustor having an oscillator at a resonance frequency which is an odd harmonic of the pulsating frequency.

It will be understood that the overall size and shape of the combustors described and illustrated above can be varied to generate a combustor which is adapted to a specific application.

As can be seen therefore, the examples described above and illustrated are intended to be exemplary only. Hence, the scope of the improvements is intended to be limited solely by the scope of the appended claims.

What is claimed is:

1. A combustor comprising:
   a resonator having a fundamental resonance frequency which corresponds to a pulsating frequency of the combustor when operating in a pulse mode, the resonator further having:
      an oscillator for use as a combustion chamber, having a fundamental resonance frequency which is an odd harmonic of the pulsating frequency, and having an inlet at an acoustic center thereof, the oscillator defining one end of the resonator;
   an exhaust pipe extending from the oscillator and having an outlet at the opposite end of the resonator; and
   an intake system connected to the inlet of the oscillator to feed the combustion chamber with fuel and air.

2. The combustor of claim 1 wherein the odd harmonic is the third harmonic.

3. The combustor of claim 1 wherein the resonator defines an acoustic low-pass filter from the oscillator to the outlet, the acoustic low-pass filter having a cut-off frequency between the pulsating frequency and the oscillator fundamental frequency.

4. The combustor of claim 1 wherein the intake system has an acoustic high-pass filter acoustically coupled to the oscillator at the inlet, the high-pass filter having a cut-off frequency between the pulsating frequency and the oscillator fundamental frequency.

5. The combustor of claim 1 wherein the intake system comprises a resonant intake tube having an inlet, and an outlet connected to the oscillator inlet, a second resonant tube having an outlet coupled to the inlet of the intake tube for ejecting fuel and air and entraining additional ambient air by the ejected fuel and air into the intake tube, and an inlet, the second resonant tube having a penetration depth into the intake tube, and a difference of area defined between the intake tube and the second tube outlet, the penetration depth and difference of area selected to define a high-pass filter from the combustion chamber, the high-pass filter having a cut-off frequency between the pulsating frequency and the oscillator fundamental frequency.

6. The combustor of claim 5 further comprising a supersonic fuel injection nozzle having an acoustic injection frequency, a first resonant tube having an inlet coupled to the nozzle for receiving the injected fuel and ambient air entrained by the injected fuel, an outlet coupled to the inlet of the second tube for ejecting fuel and air there into and for entraining additional ambient air by the fuel and air ejected therein, the first resonant tube having a first fundamental resonance frequency excitable by the fuel nozzle.

7. The combustor of claim 6 wherein the second resonant tube has a second fundamental resonance frequency which is a sub-harmonic of the first fundamental resonance frequency.

8. The combustor of claim 7 wherein the first fundamental frequency and the second fundamental frequency are harmonics of the resonator frequency.

9. The combustor of claim 7 wherein the first resonance frequency is the third harmonic of the second resonance frequency.

10. The combustor of claim 7 wherein the acoustic injection frequency is a harmonic of the first resonance frequency.

11. The combustor of claim 6 wherein the first resonant tube has a penetration depth into the second tube, and a difference of area defined between the second tube and the first tube outlet, the penetration depth and the difference of area being selected to contribute to the high-pass filter.

12. The combustor of claim 1 wherein the oscillator includes a reflector opposite the outlet, and a partial reflector between the reflector and the outlet.

13. The combustor of claim 12 wherein the reflector is a nose cone and the partial reflector is a converging section leading to the exhaust pipe.

* * * * *